United States Patent [19]

Skeels

[11] Patent Number: 5,262,141
[45] Date of Patent: Nov. 16, 1993

[54] INSERTION OF SILICON INTO THE CRYSTAL FRAMEWORK OF A ZEOLITE

[75] Inventor: Gary W. Skeels, Brewster, N.Y.

[73] Assignee: UOP, Des Plaines, Ill.

[21] Appl. No.: 992,317

[22] Filed: Dec. 21, 1992

[51] Int. Cl.$^5$ .............................................. C01B 33/26
[52] U.S. Cl. .............................. 423/328.1; 423/328.2; 502/64; 502/79; 502/85
[58] Field of Search ................ 502/64, 85, 79; 423/328.1, 328.2

[56] References Cited

U.S. PATENT DOCUMENTS

| | | | |
|---|---|---|---|
| 4,305,845 | 12/1981 | Tu | 502/64 |
| 4,503,023 | 3/1985 | Breck et al. | 502/60 |
| 5,098,687 | 3/1992 | Skeels et al. | 502/64 |
| 5,100,644 | 3/1992 | Skeels et al. | 502/85 |

*Primary Examiner*—Anthony McFarlane
*Attorney, Agent, or Firm*—Thomas K. McBride; Richard G. Miller

[57] ABSTRACT

Silicon is inserted into the crystal lattice of zeolites containing defect sites by reaction with $SiCl_4$ in the presence of oxygen. It has been found that by initially dehydrating the starting zeolite and removing the hydroxyl groups existing in the crystal defect sites, the generation of HCl from the $SiCl_4$ reagent is avoided along with the undesirable aluminum hydrolysis reactions between the HCl thus-generated and the zeolite framework. The prior dehydration and dehydroxylation makes the presence of oxygen essential to the silicon insertion.

4 Claims, No Drawings

INSERTION OF SILICON INTO THE CRYSTAL FRAMEWORK OF A ZEOLITE

FIELD OF THE INVENTION

The present invention relates in general to the treatment of zeolites to increase their as-synthesized framework $Si/Al_2$ ratio, and more particularly to a process for inserting extraneous silicon atoms derived from $SiCl_4$ into zeolite framework sites originally occupied by aluminum atoms. It is found that when a zeolite has been dealuminated and dyhydroxylated to remove the resulting $(OH)_4$ hydroxyl nests, a reaction between the zeolite and $SiCl_4$ an at elevated temperature in the essential presence of elemental oxygen results in the insertion of the silicon as a $SiO_2$ tetrahedral unit into the framework. The process is especially useful in the preparation of zeolite Y compositions having $Si/Al_2$ ratios of greater than 6.

BACKGROUND OF THE INVENTION

Heretofore four different techniques have been proposed for increasing the framework Si/Al ratio of crystalline zeolites by the extraction of aluminum atoms and at least the partial substitution of silicon atoms into the sites previously occupied by the extracted aluminum atoms. Numerous chemical extraction procedures using mineral acids, chelating agents such as ethylene diaminetetraacetic acid ($H_4EDTA$), solutions of $CrCl_3$, gaseous fluorine, phosgene and the like are also known, but the vacancies left behind by the extracted aluminum atoms are not reoccupied by silicon atoms. In the case of the $CrCl_3$ treatment, however, the substitution of chromium atoms into the vacated sites has been reported. In this regard see U.S. Pat. No. 3,937,791, Garwood et al.

Of the prior reported silicon insertion procedures, the earliest and the most thoroughly investigated involves the steaming of a hydrogen or ammonium exchanged form of the starting zeolite at temperatures usually in excess of 550° C. using a steam environment containing at least 2 psia water vapor pressure. For example, U.S. Pat No. 3,591,488 discloses that the hydrogen or ammonium form of a zeolite may be treated with steam at a temperature ranging from about 800° F. to about 1500° F. (about 427° C. to about 816° C.), and thereafter cation-exchanged with rare earth cations.

It appears to be generally accepted among those skilled in the art that in the steaming treatment aluminum atoms extracted from the crystal lattice and moved to the interstitial space are immediately replaced by a "nest" of four hydroxyl groups, and that some portion of these hydroxyl nests are in turn replaced by silicon atoms. There is not general agreement as to the source of the replacing atoms, i.e., pre-existing framework silicon atoms or occluded silicon-containing impurities, or the degree to which "healing" of the lattice occurs by virtue of silicon insertion. It has been shown, however, that steamed faujasite type zeolites develop a secondary mesopore system with pore radii in the range of 15 to 19 Angstroms, an indication that the silicon substitution mechanism does involve the migration of framework silicon atoms and possibly the elimination of entire sodalite cages. See in this regard, U. Lohse et al, Z. Anorg. Allg. Chem., 1980, 460, 179.

The second type of silicon insertion procedure heretofore proposed is reported in U.S. Pat. No. 4,503,023. In that patent specification Skeels et al describe a process for dealuminating a zeolite by treatment of the zeolite with a fluorosilicate salt in an amount of at least 0.0075 moles per 100 grams of the zeolite (on an anhydrous basis), the fluorosilicate salt being provided in the form of an aqueous solution having a pH in the range of 3 to about 7. The aqueous solution of the fluorsilicate salt is brought into contact with the zeolite at rate sufficiently slow to preserve at least 80 percent, preferably at least 90 percent, of the crystallinity of the starting zeolite. The fluorosilicate extracts aluminum from the zeolite lattice framework and substitutes silicon therein, thus increasing the $SiO_2/Al_2O_3$ molar ratio of the zeolite without introducing large numbers of defect sites into the framework. The products of this process resulting from the treatment of zeolite Y are known in the art as LZ-210.

A third procedure alleged to accomplish framework insertion of silicon is reported in Beyer et al in "Catalysis by Zeolites," ed. B. Imelik et al (Elsevier, Amsterdam, 1980) p. 203 et seq. In this procedure, apparently operable only in the case of zeolites having the faujasite type of structure, the starting zeolite is contacted with silicon tetrachloride vapor in an inert atmosphere of nitrogen at elevated temperatures, typically about 400° C. to 500° C. The reaction which occurs is ideally

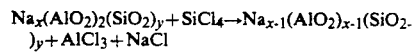

$$Na_x(AlO_2)_2(SiO_2)_y + SiCl_4 \rightarrow Na_{x-1}(AlO_2)_{x-1}(SiO_2)_y + AlCl_3 + NaCl$$

It can be theorized, however, that this reaction mechanism occurs only in the total absence of water and proceeds uncontrollably to the formation of an amorphous product. When the starting zeolite is not fully dehydrated, however, the $SiCl_4$ reagent can react with the residual water to form HCl which in turn attacks framework aluminum atoms and causes dealumination. Stabilization then proceeds in much the same manner as in the case of steam stabilization except that the stabilizing agent is $SiCl_4$ rather than $H_2O$. In any event, the Beyer et al products have a relatively low ratio of total aluminum to non-aluminum cations which is not characteristic of the LZ-210 products of the aforementioned Skeels et al process.

The fourth method proposed for framework silicon insertion utilizes silicon initially present in another portion of the crystal lattice rather than from an extraneous source. The process is reported by G. W. Skeels in U.S. Pat. No. 5,100,644 and comprises contacting and reacting a zeolite starting material with an aqueous solution of a bifluoride salt in proportions such that there is from about 0.5 to 10 moles of bifluoride ion per mole of zeolite framework aluminum the contact between zeolite and bifluoride salt solution being carried out at a temperature of from about 60° C. to 100° C. and the starting pH of the bifluoride salt solution being not greater than 7. Framework silicon and aluminum atoms are removed from the zeolite and at least some of the removed silicon atoms are inserted into sites vacated by removed aluminum atoms.

SUMMARY OF THE INVENTION

This invention provides a process for increasing the $Si/Al_2$ ratio and the thermal stability of a crystalline zeolite which comprises:

(a) providing a zeolite having a framework $Si_2/Al_2O_3$ ratio of at least 3.0, preferably between 3.0 and 15;

(b) extracting framework aluminum atoms from said zeolite to form in said framework defect sites which are occupied by hydroxyl nests having broad infrared absorbance in the range of 3745 cm$^{-1}$ to 3000 cm$^{-1}$;

(c) dry calcining the composition of step (b) to remove at least the major portion, preferably substantially all, of said hydroxyl groups having infrared absorbance in the range of 3745 cm$^{-1}$ to 3000 cm$^{-1}$ and to remove substantially all of any adsorbed H$_2$O present on the zeolite; and (d) contacting and reacting the dehydrated and dehydroxylated zeolite composition of step (c) with a mixture comprising molecular oxygen and SiCl$_4$, said contacting and reacting being at a temperature within the range of 350° C. to 650° C. for a period of time to result in the insertion of extraneous silicon derived from said SiCl$_4$ into dehydroxylated defect sites in the zeolite lattice.

DETAILED DESCRIPTION OF THE INVENTION

The crystalline zeolite starting materials suitable for the practice of the present invention can be any of the well known naturally occurring or synthetically produced zeolite species which have pores large enough to permit the passage of SiCl$_4$ and reaction products through their internal cavity system. These materials can be represented, in terms of molar ratios of oxides, as

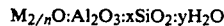

M$_{2/n}$O:Al$_2$O$_3$:xSiO$_2$:yH$_2$O wherein "M" is a cation having the valence "n", "x" is a value of at least about 3 and "y" has a value of from zero to about 9 depending upon the degree of hydration and the capacity of the particular zeolite to hold adsorbed water.

For reasons more fully explained hereinafter, it is necessary that the starting zeolite be able to withstand the initial loss of framework aluminum atoms to at least a modest degree without collapse of the crystal structure. In general the ability to withstand aluminum extraction and maintain a high level of crystallinity is directly proportional to the initial Si/Al$_2$ molar ratio of the zeolite. Accordingly it is preferred that the value of "x" in the formula above be at least about 3, and more preferably at least about 3.5. Also it is preferred that at least about 50%, and more preferably at least about 95%, of the AlO$_2$ tetrahedra of the naturally occurring or as-synthesized zeolite are present in the framework of the starting zeolite.

The cation population of the starting zeolite is not a critical factor. It should be noted, however, that since the present process involves the initial extraction of framework aluminum atoms, it is advantageous that the reagents employed for that purpose do not form water-insoluble salts in the zeolite pore system. For example, if ammonium fluorosilicate is the reagent used for aluminum extraction, it is advisable to use the ammonium cation form of the starting zeolite rather than the sodium or potassium cation form which results in the formation of Na$_3$AlF$_6$ and K$_3$AlF$_6$ respectively, both of which are only very sparingly soluble in either hot or cold water. Also, as is well-known, the ability of certain reagents to hydrolyze and extract framework aluminum atoms from zeolites is dependent upon the cation species present, e.g., steam is not particularly effective in this regard unless the cations are non-metallic.

The naturally occurring or synthetic zeolites used as starting materials in the present process are compositions well known in the art. A comprehensive review of the properties and chemical compositions of crystalline zeolites is contained in Breck, D. W., "Zeolite Molecular Sieves," Wiley, N.Y., 1974, and is incorporated herein by reference. In those instances in which it is desirable to replace original zeolitic cations for others more preferred in the present process, conventional ion-exchange techniques are suitably employed. Especially preferred zeolite species are zeolite Y, zeolite rho, zeolite W, zeolite N-A, zeolite L, zeolite ZSM-5, zeolite ZSM-11 and the mineral and synthetic analogs of mordenite, clinoptilolite, chabazite, offretite and erionite.

The method for extracting aluminum atoms from the crystal lattice is not critical, it being necessary only that such removal is accomplished without degrading the crystal structure to a point where the subsequent treatment with SiCl$_4$ cannot be successfully carried out, i.e., silicon insertion does not occur and the extracted aluminum atoms are each replaced by four protons to create hydroxyl nest defect sites. Perhaps he simplest technique is simply to contact the starting zeolite with an aqueous solution of a strong acid, such as HCl or HNO$_3$. The proportions of acid and zeolite and the contact temperature are largely dependent upon the Si/Al ratio of the starting zeolite. Another simple and closely related technique is the use of a chelating agent such as ethylenediaminetetraacetic acid. When applied to a metal cation form of a zeolite such as NaY, the proposed mechanism involves the initial partial conversion of the zeolite to the H$^+$ cation form, the consequent hydrolysis of aluminum to create defect sites and the formation of Al(OH)$_2$$^+$ cations, followed by the exchange of the aluminum cations by sodium cations. One of the most commonly employed aluminum extraction procedures is steaming a non-metallic cation form of the zeolite at elevated temperatures, usually in excess of 500° C. While this treatment hydrolyzes and extracts framework aluminum, it also serves to transport either extraneous impurity silicon or silicon from another part of the crystal lattice to the newly created defect site and thus results in a partially "healed" structure. While in theory a completely healed lattice devoid of defect sites is achievable by appropriate steaming, in practice such steamed zeolites retain many defect sites and are thus well-suited as compositions for the SiCl$_4$ treatment step of the process of this invention. One of the earlier proposed steaming treatments for zeolite Y is disclosed by Kerr in U.S. Pat. No. 3,493,519. Eberly et al disclosed in U.S. Pat. No. 3,506,400 an aluminum extraction process in which steaming and acid extraction are performed as alternating steps to obtain compositions having very high Si/Al ratios.

The use of fluoride ions in aqueous media to extract framework aluminum has been proposed using a wide variety of fluorine-containing compounds. Aqueous solutions of alkali metal fluorides, e.g., LiF, NaF, KF, RbF and CsF, are utilized in the process of U.S. Pat. No. 4,427,789. In U.S. Pat. No. 4,427,790, compounds having a complex fluoroanion moiety such as BF$_4$$^-$, PF$_6$$^{-2}$ and TaF$_8$$^{-3}$ are utilized to increase the framework Si/Al ratio of zeolites having initial ratios of greater than 100. As referred to hereinabove, treatments involving bifluoride salts and ammonium fluorosilicates, although intended primarily as agents to induce silica insertion in conjunction with aluminum extraction in zeolite materials, nevertheless can be readily operated in a manner in which defect sites remain in the zeolite products. These products are suitable for treatment with SiCl$_4$ in accordance with the present process.

Prior to the reaction with the SiCl₄ reagent, the zeolite must be thoroughly dehydrated to remove adsorbed water and to dehydroxylate and remove the hydroxyl nests from at least a major proportion of the defect sites into which silicon insertion is to occur. This step is important to avoid, or at least minimize, the formation of HCl by the reaction of water with the SiCl₄ and the consequent undesirable results which, as referred to hereinabove, are produced by the HCl attacking framework aluminum atoms. Without wanting to be limited to any particular theory, it is generally believe in the art that the hydroxyl nests referred to in the specification and the claims are produced by the mechanism of the equation

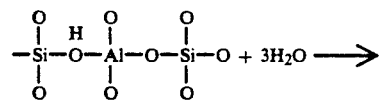

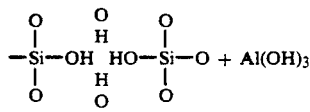

A routine calcination at temperatures of from about 500° C. up to the crystal destruction temperature carried out in a vacuum or an environment of air or inert gas such as nitrogen, helium or argon, is all that is required for this purpose. Advantageously the calcination temperature exceeds the temperature of the subsequent reaction between the zeolite and the SiCl₄ in order that any dehydroxylation of other types of zeolitic hydroxyl groups does not generate water during the SiCl₄ reaction stage.

After the dehydration and dehydroxylation has been accomplished, the zeolite is brought into contact with oxygen and the SiCl₄ reagent. The manner in which the reactants are brought into contact is not a critical factor. Conveniently the calcined zeolite can be cooled to ambient room temperature under an anhydrous atmosphere and mixed with the SiCl₄, thus avoiding rehydration of the zeolite and hydrolysis of the SiCl₄. Thereafter the mixture thus formed can be placed in a shallow container in a larger reactor sealed except for an inlet means to permit the introduction of oxygen or an oxygen-containing stream such as air, and an outlet means, if required, through which the inert constituents of the oxygen-containing stream can be withdrawn. Provided there is at least a stoichiometric quantity of SiCl₄ employed to insert a silicon atom into each defect site desired to be removed from the crystal lattice, the proportions of zeolite and SiCl₄ are not critical. A large excess of both oxygen and SiCl₄ can be used.

Without wanting to be bound by any particular theory as to the mechanism of the reaction between the dehydroxylated zeolite, the oxygen and the SiCl₄, it can be conceptualized that the dehydroxylation of a zeolitic hydroxyl nest results in the formation of two molecules of water leaving two atoms of oxygen bonded to silicon atoms of the zeolite framework. In order for the silicon atoms derived from the SiCl₄ to be inserted into the framework as tetrahedral oxide units, two additional oxygen atoms must be provided. This would account for the observation that extraneous oxygen is an essential reagent in the present process. During the reaction, chlorine gas is evolved and can be removed from the system as such. The product zeolite is essentially chloride free.

Represented by an equation, the apparent mechanism of the reaction between an anhydrous aluminum-depleted starting zeolite and SiCl₄ is:

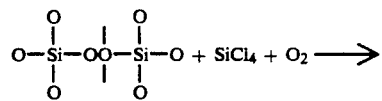

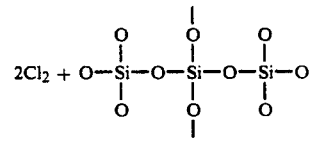

Thus in marked contrast with the process of this invention, the process of Beyer et al referred to hereinbefore does not involve a reaction between SiCl₄ and a previously dehydroxylated zeolite. In the Beyer et al process a fully cationized zeolite such as an as-synthesized NaY or its corresponding NH₄⁺ exchanged form is partially but not fully dehydrated prior to contact with the SiCl₄ in an environment of an oxygen-free gas. Accordingly at the temperature of the reaction, the residual water vapor or OH groups on the zeolite react with the SiCl₄ to produce protons and hydrolyze the SiCl₄ to SiO₂. The HCl can also hydrolyze and extract more framework aluminum atoms and create more hydroxyl nests to be dehydroxylated and form more water, and so forth. HCl and Al(OH)₃ can also be produced by the reaction of water with the AlCl₃ initially produced upon the extraction of framework aluminum atoms. The Al(OH)₃ is readily converted to Al(OH)₂⁻ cations found in the Beyer et al zeolite products, and is also an active reagent to reinsert aluminum into the framework.

The process of this invention is illustrated by the following examples.

EXAMPLE 1

(a) Preparation of Aluminum-Deficient Zeolite Y

A charge of 151.4 grams NaY (100 grams anhydrous weight) was slurried in a round bottomed flask containing 2 liters of boiling distilled water and 63.94 grams dissolved H₄EDTA. The slurry was heated under reflux conditions with continuous stirring for 16 hours. At the end of this period the solids were recovered by filtration and washed with hot distilled water until the wash water was free of aluminum ions. By analysis, the chemical composition was found to be, on an anhydrous basis:

| |
|---|
| 7.4 wt. % Na₂O |
| 14.1 wt. % Al₂O₃ |
| 76.4 wt. % SiO₂ |

It is apparent from these data that about 50 percent of the original framework aluminum had been extracted. The crystallinity, as determined by X-ray powder diffraction, was found to be nearly 100% by comparison with the starting NaY zeolite. The measured unit cell, $a_0$, for the aluminum-depleted NaY was 24.658 A compared to 24.689 A for the untreated NaY. No significant shrinkage of the unit cell is observed as a result of simple dealumination of the zeolite.

(b) SiCl₄ Treatment of Aluminum-Depleted Zeolite Y Activated at 500° C.

Fifty grams of the aluminum-depleted NaY prepared in part (a) above was placed into a horizontal bed in a quartz tube in a furnace and heated under flowing dry air at 500° C. for four hours, poured into a round bottomed flask and closed with a stopcock. The sample, along with a separate container of SiCl₄, was placed in a dry box and cooled using a purge stream of dry flowing N₂. After a 24 hour period of purging with dry N₂, an amount of SiCl₄ equivalent to the amount of removed aluminum from the zeolite, 12.53 cc (18.59 grams), was added to the zeolite in the round bottomed flask. Heat was evolved from the flask as the zeolite was shaken with the SiCl₄ to achieve a thorough mixing. The stopper was closed and the flask set aside until cool. A portion of the SiCl₄ treated zeolite was placed into a horizontal quartz tube with stopcocks on either end, the stopcocks closed and the tube removed from the purge box. The quartz tube was placed in a horizontal tube furnace and heated under flowing dry air to 350° C. for two hours. The sample was cooled and a standard X-ray powder diffraction pattern obtained. The relative percent retained crystallinity was measured as about 50%; the unit cell $a_O$ was estimated to be about 24.4 A, as compared to the value of the untreated aluminum-depleted NaY of about 24.7 A. It was determined that not all of the SiCl₄ had reacted with the zeolite in this instance.

(c) SiCl₄ Treatment of Aluminum-Depleted Zeolite Y Activated at 550° C.

Using the same apparatus as in part (b) another portion of the dealuminated NaY of part (a) was put into a horizontal tube and heated, as described in part (b) above, to a temperature of 550° C. under flowing dry air. The X-ray powder pattern of the cooled sample showed greater than 80% retention of X-ray intensity as compared to the starting aluminum-depleted NaY. The measured unit cell dimension, $a_O$, was 24.369 A. The aluminum-depleted NaY had a measured $a_O$ of 24.652, indicating a substantial shrinkage of the unit cell which is consistent with insertion of Si into vacant tetrahedral sites in the zeolite.

EXAMPLE 2

(a) Preparation of Aluminum-Deficient Zeolite Y

A charge of 679.5 grams NaY (450 grams anhydrous weight) was slurried in a 12-liter round bottomed flask containing eight liters of boiling distilled water and 287.7 grams dissolved H₄EDTA. The slurry was heated under reflux conditions with continuous stirring for 110 hours. At the end of this period the solids were recovered by filtration and washed with hot distilled water until the wash water was free of aluminum ions. By analysis, the chemical composition was found to be on an anhydrous basis:

| |
|---|
| 7.2 wt. % Na₂O |
| 14.0 wt. % Al₂O₃ |
| 78.3 wt. % SiO₂ |

Accordingly, about 50 percent of the original framework aluminum had been extracted. The crystallinity, as determined by X-ray powder diffraction, was found to be nearly 100% by comparison with the starting NaY zeolite. The measured unit cell, $a_O$, for the aluminum-depleted NaY was 24.652 A compared with 24.689 A for the untreated NaY. No significant shrinkage of the unit cell was observed as a result of simple dealumination of the zeolite.

(b) SiCl₄ Treatment of Aluminum-Depleted Zeolite Y Activated at 210° C.

Twenty five grams of the aluminum-depleted Zeolite Y prepared above were placed into a horizontal bed in a quartz tube in a furnace and heated under flowing dry air at 210° C. for four hours, poured into a round bottomed flask and closed with a stopcock. The sample was placed in a dry N₂ purge box under dry flowing N₂ along with a separate container of SiCl₄ and cooled to ambient room temperature. After purging and cooling with dry N₂ to avoid the presence of oxygen in the resulting reaction system, an amount of SiCl₄ equivalent to the amount of removed aluminum from the zeolite, 12.13 grams, was added to the zeolite in the round bottomed flask. Heat was evolved from the flask as the zeolite was shaken with the SiCl₄ to achieve a thorough mixing. The stopper was closed and the flask cooled. The SiCl₄ treated zeolite was placed into a horizontal quartz tube with stopcocks on either end, the stopcocks closed and the tube removed from the purge box. The quartz tube was placed in a horizontal tube furnace and heated under flowing dry air to 650° C. for 24 hours. The sample was cooled and a standard X-ray powder diffraction pattern was obtained. The product was X-ray amorphous. This example demonstrates that inadequate activation of the zeolite at 210° C. results in destruction of the zeolite, presumably due to residual water on the zeolite reacting with SiCl₄ to produce acid which destroys the zeolite.

(c) SiCl₄ Treatment of Aluminum-Depleted Zeolite Y in the Absence of Oxygen After Activation at 550° C.

Additional samples of the dealuminated zeolite Y prepared in part (a) of this Example 2 were activated in air at 550° C. for 4 hours and treated with SiCl₄ as described above in Example 2(b). The samples were put into a horizontal tube and reacted with SiCl₄ at 550° C. as described above except that they were heated under either flowing dry argon or nitrogen to avoid the presence of oxygen. The X-ray powder pattern of the cooled samples did not show any shrinkage of the unit cell despite retention of the major portion of the X-ray intensity. This example demonstrates that the reaction does not take place in an inert atmosphere, and that when the zeolite is activated at 550° C. the zeolite is not destroyed by the SiCl₄ reaction with residual water on the zeolite.

EXAMPLE 3

(c) SiCl₄ Treatment of Aluminum-Depleted Zeolite Y Activated at 550° C.

Twenty five grams of the aluminum-depleted Zeolite Y prepared above in Example 2(a) were placed into a horizontal bed in a quartz tube in a furnace and heated under flowing dry air at 550° C. for two hours, poured into a round bottomed flask closed with a stopcock and transferred, along with a separate container of SiCl₄, to a dry N₂ purge box under dry flowing N₂. After purging with dry N₂, an amount of SiCl₄ equivalent to the amount of removed aluminum from the zeolite, 12.13 gm was added to the zeolite in the round bottomed flask. Heat was evolved from the flask as the zeolite was shaken with the $SiCl_4$ to achieve a thorough mixing. The stopper was closed and the flask cooled. The $SiCl_4$ treated zeolite was placed into a horizontal quartz tube with stopcocks on either end, the stopcocks closed and the tube removed from the purge box. The quartz tube was placed in a horizontal tube furnace and heated under flowing dry air to 540° C. for 18 hours. A water scrubber was attached to the effluent end of the tube to trap any gaseous reaction products. Following completion of the treatment, the effluent scrubber was analyzed and found to contain a significant amount of $Cl_2$. This finding demonstrates the need for air or oxygen to be present during the firing of the mixture of $SiCl_4$ and the aluminum-depleted zeolite Y. The presence of the $Cl_2$ in the effluent indicates it is likely that the $SiCl_4$ reacts with dehydroxylated dealuminated sites in the zeolite, using extraneous $O_2$ to replace oxygen lost from the framework during dehydroxylation, with the consequent production of $Cl_2$. The sample was cooled and a standard X-ray powder diffraction pattern was obtained. The X-ray powder pattern showed that greater than 90% of the X-ray peak intensity was retained as compared to the starting aluminum-depleted NaY. The measured unit cell dimension, $a_O$, was 24.364 A. The aluminum-depleted NaY had a measured $a_O$ of 24.652. Hydroxyl region infrared spectra were taken which showed that the broad adsorption band between 3745 $cm^{-1}$ and about 3000 $cm^{-1}$ attributable to hydrogen-bonded OH groups in dealuminated sites, and present in the aluminum-depleted zeolite Y, had been substantially eliminated. These observations indicate that Si had substituted into the dealuminated sites of the framework.

What is claimed is:

1. Process for increasing the $Si/Al_2$ ratio and the thermal stability of a crystalline zeolite which comprises the steps of:
    (a) providing a zeolite having a framework $SiO_2/Al_2O_3$ ratio of at least 3.0;
    (b) extracting framework aluminum atoms from said zeolite to form in said framework defect sites which are occupied by hydroxyl groups having broad infrared absorbance in the range of 3745 $cm^{-1}$ to 3000 $cm^{-1}$;
    (c) dry calcining the composition of step (b) to remove at least a major portion of said hydroxyl groups having infrared absorbance in the range of 3745 $cm^{-1}$ to 3000 $cm^{-1}$ and to remove substantially all of any adsorbed $H_2O$ present on the zeolite; and
    (d) contacting and reacting the dehydrated and dehydroxylated zeolite composition of step (c) with a mixture comprising molecular oxygen and $SiCl_4$, said contacting and reacting being at a temperature within the range of 350° C. to 650° C. for a period of time to result in the insertion of extraneous silicon derived from said $SiCl_4$ into dehydroxylated defect sites in the zeolite lattice.

2. Process according to claim 1 wherein the zeolite provided in step (a) is zeolite NaY.

3. Process according to claim 2 wherein the dry calcination of step (c) is carried out at a temperature of at least 500° C. and for a sufficient period of time to remove substantially all of the hydroxyl groups having infrared absorbance in the range of 3745 $cm^{-1}$ to 3000 $cm^{-1}$.

4. Process according to claim 3 wherein in step (d) the molecular oxygen is imparted to the reaction mixture in the form of air.

* * * * *